United States Patent [19]

Luthringshauser et al.

[11] 4,423,112

[45] Dec. 27, 1983

[54] IMPREGNATING AGENT FOR MATERIALS CONTAINING CELLULOSE

[75] Inventors: Bruno Luthringshauser, St. Augustin; Claus Lindzus, Cologne, both of Fed. Rep. of Germany

[73] Assignee: Dynamit Nobel Aktiengesellschaft, Cologne, Fed. Rep. of Germany

[21] Appl. No.: 214,593

[22] Filed: Dec. 8, 1980

[51] Int. Cl.$^3$ .......................... B27K 3/16; C09K 3/00

[52] U.S. Cl. .................................. 428/389; 428/537; 428/541; 106/287.14; 106/287.16

[58] Field of Search ...................... 106/287.14, 287.16, 106/163 R; 428/266, 275, 389, 390, 391, 537, 541

[56] References Cited

U.S. PATENT DOCUMENTS 3,879,206 4/1975 Nestler .......................... 106/287.16
3,894,881 7/1975 Suzuki ........................... 106/287.16
3,955,988 5/1976 Bosch ............................ 106/287.16

*Primary Examiner*—John C. Bleutge
*Assistant Examiner*—Patricia Short
*Attorney, Agent, or Firm*—Sprung, Horn, Kramer & Woods

[57] ABSTRACT

An impregnating agent for a cellulose-containing material, comprising (a) An alkyltrialkoxysilane of the formula R Si $(OR')_3$ in which R represents an alkyl moiety of 1 to 18 carbon atoms and R' an alkyl moiety of 1 to 4 carbon atoms, and (b) Chelate of alcoholate of tin or of a metal of the third main group or fourth or fifth secondary group of the periodic system of the elements, and/or optionally (c) Silicic acid ester, and a method for water-proofing cellulosic materials by contacting the same with such impregnating agent.

25 Claims, No Drawings

IMPREGNATING AGENT FOR MATERIALS CONTAINING CELLULOSE

BACKGROUND OF THE INVENTION

1. Field of the Invention

The invention relates to a new impregnating agent for cellulose-containing material. Its active component is a monomeric alkyl silane or a oligomer thereof. Its action is based on the addition of certain metallic acid esters.

2. Discussion of Prior Art

It is known from German Auslegeschrift No. 1277192 to make cellulose-containing material water-repellent by means of chlorosilanes. In this method of treatment, the chlorosilanes are transposed to form silicones, so that ultimately a silicone coating is formed on the surface. This method of treatment has the disadvantage that, in its application, acid reaction products form which have to be eliminated in a subsequent neutralization.

It is furthermore known to use silicones directly as impregnants. In this case, however, the silicones must be used in the form of aqueous emulsions. These emulsions have to be stabilized. Suitable stabilizers for the purpose are, for example, basic zirconium and/or titanium salts of monocarboxylic acids (cf. German Pat. No. 1285441 and German Pat. No. 1469313). The zirconium and titanium salts are intended in these impregnants to increase the stability of an aqueous silicone emulsion and thus to increase their concentration and effectiveness. The preparation of this emulsion, however, still involves a relatively great technical investment. Furthermore, the emulsions that are obtained do not have an unlimited shelf life.

SUMMARY OF THE INVENTION

An impregnating agent for cellulose-containing material has now been found which comprises a mixture of a monomeric alkoxysilane and a chelate or alkyl ester of tin or of a metal of the third main group or of the fourth and fifth secondary group of the periodical system of the elements. If desired, this mixture can also contain a silicic acid ester or mixture of silicic acid esters. This mixture can be used as is or dissolved in an appropriate organic solvent By the term "monomeric alkyl trialkoxysilane" there is meant the pure monomer and oligomers with up to 10, preferably up to 5 repeating —SiO— units. The silicic acid ester or esters can be used together with the chelate or alkyl ester or can replace the chelate or alkyl ester.

When such a mixture is used as an impregnating agent for cellulose-containing material, the disadvantages of the formerly known impregnants mentioned above are no longer encountered. The new agents can be used directly and no alkaline after-treatment of the impregnated material is necessary. Their preparation is extremely simple, and they can be stored for a virtually unlimited length of time with the exclusion of air.

Furthermore, the new impregnating agents do not form a continuous polymeric film on the surface being treated, as is the case with silicones. Instead, the impregnating agent penetrates into the pores of the substrate and there becomes chemically anchored. It can no longer be removed mechanically from the surface, much less pulled away therefrom.

The surfaces to be treated include cellulose in pure form as well as in all its natural and synthetic modifications and forms of fabrication. The term "pure cellulose" is to be understood as referring, for example, to paper, such as filter paper or cellulose threads, while the term, "modifications or forms of fabrication," is to be understood to mean products such as paperboard, paperboard boxes, wood, chipboard, cotton threads or cotton fabrics. The new impregnating agent is particularly well suited for the waterproofing of paper in all its forms of fabrication, but good results can also be achieved in the impregnation of wood. The results on wood can be still further improved if the impregnating agent additionally contains up to approximately 20% of silicic acid tetraalkyl esters, or their oligomers with up to 10 silicon atoms, with respect to the weight of the alkyl trialkoxysilane. In these tetraalkyl esters, the preferred alkyl groups are the methyl group and the ethyl group. The oligomers of these silicic acid esters are prepared by controlled partial hydrolysis. They contain up to 10 Si—O—Si bonds and have a silicon dioxide content between 29 and 52 percent.

In the impregnation of paper, the addition of silica acid esters in addition to that of the metal compounds is generally no longer necessary, because even without the silicic acid esters a very good waterproofing is achieved, which generally is in need of no improvement. However, in the waterproofing of papers, a silicic acid ester can be used instead of the metal compounds of the elements of the fourth and fifth secondary group of the periodic system.

The material that is to be impregnated does not need to be dry before the application of the impregnating agent; even wet surfaces can successfully be waterproofed with the new impregnating agent, provided that the material still has a sufficient ability to absorb the impregnating liquid.

The action of the new impregnating agents is based on a synergistic effect of the individual substances of the mixture. It is known that alkyl trialkoxysilanes have no or virtually no impregnating action on cellulose-containing material. Chelates of titanium, or the named metallic acid esters including silicic acid ester, also have virtually no waterproofing action in dilute solutions, while in the form of concentrated solutions they have no more than a very slight waterproofing action on cellulose. But as soon as mixtures of these two classes of compounds are used as impregnating agents, a decided waterproofing is obtained. The action appears with as little as 5% of alkyl trialkoxysilane in the mixture, by weight, and it is still obtained when 99.5% of the weight of the mixture consists of alkyl trialkoxysilanes. The preferred range, however, is a weight ratio of silane to the claimed second components between 98:2 and 60:40. Most preferably this weight ratio is 90:10 to 50:50.

If the impregnating agent is to be dissolved in the solvent for use, even low concentrations suffice to produce an effect. Waterproofing effects are obtained in papers with even 0.5 wt.-% solutions, so that one can produce graduated impregnations with the new impregnating agent. This permits one to produce defined impregnation qualities on papers.

Any solvent is suitable in which alkyl trialkoxysilanes and the specified metal compounds are soluble, examples being alcohols, ethers, ketones and hydrocarbons. Preferred solvents are those which are miscible with water, such as, for example, alcohols of one to four carbon atoms, and acetone.

The usable alkyl trialkoxysilanes correspond to the formula $RSi(OR')_3$,

R representing a branched or unbranched alkyl moiety of 1 to 18 carbon atoms, preferably 1 to 10 carbon atoms, and R′ representing an alkyl moiety of 1 to 4 carbon atoms, which can be interrupted, if desired, by one or more oxygen atoms.

The chelates which can be used in accordance with the invention include mainly the acetyl acetonates of titanium, vanadium and zirconium. However, the acetyl acetonates of aluminum or tin are usable according to the invention. Mixtures of these compounds can also be used, or chelates containing these compounds complexly bound as double salts. Organic compounds containing hydroxyl groups, such as glycols, alkanolamines or acetic acid esters are also suitable as chelating agents.

The usable metallic acid esters can be characterized by the formulas:

$Me^{III}(OR)_3$, $Me^{IV}(OR)_4$, $Me^{IV}O(OR)_2$ and $Me^{V}O(OR)_3$, in which $Me^{III}$ represents a metal from the third principal group, $Me^{IV}$ a metal from the group consisting of silicon, titanium, zirconium or hafnium, and $Me^{V}$ a metal from the fifth secondary group of the periodic system of the elements, and R represents an alkyl moiety of 1 to 8 carbon atoms. However, the oligomers of these esters in which up to ten Me—O— Me units are present can also be used, provided these compounds are stable, as in the case, for example, of the alkyl silicates and alkyl titanates.

The preferred metallic acid esters are the tetraalkyl titanates and their oligomers, in which the alkyl groups can have between 2 and 6 carbon atoms.

The new impregnating agents are prepared simply by mixing the components together and diluting, if desired, with a solvent. Application is performed in a known manner, by brushing, dipping or spraying the solutions, with the simultaneous application of elevated or reduced pressure. Silicic acid esters which can be used include the tetra alkyl esters wherein the alkyl group is 1–8 carbon atoms. The alkyl group can be interrupted by an oxygen atom in the chain.

EXAMPLES

Example 1

10 weight-parts of isobutyltrimethoxysilane were mixed with one part of titanium$^{IV}$ acetylacetonate [diisopropoxy-bis-(2,4-pentanedionato)titanium(IV)] and a 10% solution in ethanol was prepared. A filter paper (No. 1575 of Schleicher & Schull) was impregnated with this solution and let stand in a moist chamber for one week, and then dried for one hour at 80° C.

A water drop (approximately 0.5 $cm^3$) was applied to the filter paper thus treated, and covered with a watch crystal. Twenty-one hours later, the drop of water had not been absorbed into the paper; at the end of this period it had evaporated.

For comparison, a filter paper of equal quality was imbibed with a 1% solution of titanium$^{IV}$ acetylacetonate, and let stand and dried in the same manner. A drop of water placed thereon had been fully absorbed within 13 minutes and produced a water stain of 9.0 cm diameter.

For further comparison, a filter paper of equal quality was imbibed with a 10% solution of isobutyltrimethoxysilane in ethanol, and let stand and dried in the same manner as described above. A water drop placed on it thereafter was absorbed within 151 seconds and produced a water stain of 6.0 cm diameter.

Example 2

A filter paper of the quality described in Example 1 was imbibed with a 10% solution in ethanol of a mixture of 50 weight-parts of isobutyltrimethoxysilane and 50 weight-parts of titanium$^{IV}$ acetylacetonate. The paper was stored for one week in the moist chamber and then dried for one hour at 80° C.

A drop of water was applied to the paper thus treated, and then the paper was covered with a watch crystal. 21 hours later the drop had not been absorbed by the paper; after that it had evaporated.

Example 3

The procedure of Example 2 was repeated except that a mixture of one part of isobutyltrimethoxysilane and 10 parts, by weight, of titanium$^{IV}$ acetylacetonate was used. The water drop had not been absorbed by the paper after 27.5 hours; thereafter it had evaporated.

Example 4

One part by weight of a commercially obtainable oligomeric silicic acid tetraethyl ester having a silicon dioxide content of 40% and an average of 5 Si—O—Si units (Dynasil ®40, made by Dynamit Nobel AG) was mixed with 10 weight-parts of isobutyltrimethoxysilane, and a 10% solution of the mixture in ethanol was prepared. With this solution, filter paper of the quality specified in Example 1 was imbibed and exposed for 7 days to a relative atmospheric humidity of 95%. Then the paper was dried for one hour at 80° C.

After drying, the paper was placed on a glass plate and then a drop of about 0.5 $cm^3$ of water was placed on the paper. The drop was covered with a watch crystal. 24 hours later the drop had not been absorbed by the paper; thereafter it had evaporated.

Example 5

10 weight-parts of isobutyltrimethoxysilane were mixed with one weight-part of butyl titanate and a 10% ethanolic solution of this mixture was prepared. With this solution a filter paper of the kind specified in Example 1 was imbibed, and then dried at room temperature.

At the end of 24 hours, a water drop of about 0.5 $cm^3$ was placed on the paper and the drop was covered with a watch crystal. 24 hours later the drop had not been absorbed by the paper; after that it evaporated.

The same result was obtained when the paper was exposed for 7 days to a relative humidity of 95% in a moist chamber after impregnation with the solution, and was then dried for one hour at 80° C.

Example 6

One weight-part of octyltriethoxysilane was mixed with 10 weight-parts of titanium$^{IV}$ acetylacetonate, and a 1% solution of the mixture in ethanol was prepared. A filter paper of the kind described in Example 1 was impregnated with this solution, and the impregnated paper was stored for one week at a relative atmospheric humidity of 95%. Then the paper was dried for one hour at 80° C.

A drop of about 0.5 $cm^3$ of water was placed on the dry paper and was then covered with a watch crystal. At the end of 30 hours the paper had not been absorbed by the paper; after that it evaporated.

For comparison, a filter paper of the same quality was impregnated with a 1% solution of octyltriethoxysilane, and a second filter paper was impregnated with a 10% solution of octyltriethoxysilane in ethanol. The water drops were absorbed by the paper within 12 and 25 minutes, respectively, and a water stain of about 8.5 cm diameter resulted.

Example 7

The procedure of Example 6 was repeated with a mixture of equal parts of octyltriethoxysilane and titanium$^{IV}$ acetylacetonate, but in one case a 10% solution in ethanol was used, and in a second case an 0.5% solution in ethanol. In both cases the water drop remained unabsorbed by the paper for 30 hours. Even when the paper was not stored at the high humidity, but was only dried for 24 hours at room temperature, the same results were obtained.

Example 8

Example 6 was repeated, except that a mixture of 10 weight-parts of octyltriethoxysilane and 1 weight-part of titanium$^{IV}$ acetylacetonate was used in the form of a 1% solution in ethanol. In this case, too, the water drop evaporated after 30 hours without having penetrated into the paper.

Example 9

A 1% ethanolic solution of a mixture of 10 weight-parts of octyltriethoxysilane and 1 weight-part of butyl titanate was prepared. A filter paper was imbibed with this solution; a part of the paper was allowed to dry at room temperature for 24 hours; another part was subjected to storage in a chamber at 95% relative atmospheric humidity and then dried for one hour at 80° C.

A water drop was not absorbed by either specimen in 24 hours; after that it had evaporated.

Example 10

The procedure of Example 6 was repeated with a 1% ethanolic solution of a mixture of equal parts by weight of octyltriethoxysilane and vanadium$^{III}$ acetylacetonate. After 30 hours the water drop had not been absorbed by the paper; thereafter it had evaporated.

Example 11

A solution of 20 g of butyltrimethoxysilane in 100 g of ethanol was mixed with 2.5 g of a 75% solution of titanium$^{IV}$ acetylacetonate in isopropanol. The cut surfaces of two hardwood (cherry) blocks were brushed with this solution until saturated, one of the cut surfaces being produced by a radial cut and, in the case of the second block, by a crosscut (end grain). Then the blocks were let stand for 24 hours. They were then stored horizontally and about 5 $cm^3$ of water was dripped onto the treated surface. The water drew together and the surface of the wood retained its original shade. After storage for about 3 days at 15° C. the water had evaporated without having penetrated the wood.

The experiment was repeated except that a solution of 10 g of butyltrimethoxysilane, 10 g of silicic acid tetraethyl ester and 2 g of titanium$^{IV}$ acetylacetonate in 100 g of ethanol was used as the impregnating solution. In this case again, the water drew together and the surface of the wood retained its original color shade. The water did not evaporate until after 60 hours, without having penetrated the surface of the wood.

For comparison, a wood block of the same wood was brushed to saturation on the same cut surfaces, with a 20% ethanolic solution of butyltrimethoxysilane, and let stand for 24 hours. Then about 5 $cm^3$ of water was dripped onto this block. The water immediately spread out over the entire surface, giving the wood a darker shade. At the end of 24 hours at room temperature, the absorbed water had evaporated away.

Example 12

Blocks of softwood (dimensions: 3×4×5 cm) were laid for 10 minutes in a 10 wt.-% solution of equal parts of isobutyltrimethoxysilane and titanium$^{IV}$ acetylacetonate and then let stand for 7 days at a relative atmospheric humidity of 95%.

After the final storage, the blocks were weighed and then put underwater for 24 hours. Then they were freed of adhering water and weighed again. After this submersion, which represents a very severe test, these blocks had absorbed an average of only 8% by weight.

For comparison, identical wood blocks were soaked in the same manner with an only 10% alcoholic solution of isobutyltrimethoxysilane in one case and titanium$^{IV}$ acetylacetonate in the other and then treated in the same manner. These blocks absorbed an average of 28% of water by weight (in the case of treatment with isobutyltrimethoxysilane) and 42% by weight (in the case of treatment with titanium$^{IV}$ acetylacetonate).

What is claimed is:

1. An impregnating agent for a cellulose article comprising (a) An alkyltrialkoxysilane of the formula R Si(OR')$_3$, in which R represents an alkyl moiety of 1 to 18 carbon atoms and R' and alkyl moiety of 1 to 4 carbon atoms, and (b) A chelate of a metal of the third main group or fourth or fifth secondary group of the periodic system of the elements, wherein component (a) is present in the mixture in an amount between 5 and 99.5% by-weight and component (b) is present in said mixture in an amount between 0.5 and 95 wt.-%, said alkyltrialkoxysilane and said chelate being present in amounts effective to produce an impregnating agent which has a waterproofing action on cellulose.

2. An impregnating agent according to claim 1, wherein said chelate is a chelate of titanium, vanadium, zirconium or aluminum and said titanium, vanadium, zirconium or aluminum is chelated with acetyl acetonate.

3. An impregnating agent according to claim 1, wherein the amount of the alkyltrialkoxysilane is between 40 and 98 weight percent.

4. An impregnating agent according to claim 1, wherein said alkyl trialkoxysilane is octyltriethoxysilane.

5. An impregnating agent according to claim 1, wherein said alkyl trialkoxysilane is isobutyltrimethoxysilane.

6. An impregnating agent according to claim 1, additionally containing an silicic acid ester.

7. An impregnating agent according to claim 6, wherein the combined amount of components (b) and the silicic acid ester is between 2 and 40 weight percent, based on the combined weight of components (a), (b) and the silicic acid ester.

8. An impregnating agent according to claim 1, additionally containing an inert solvent.

9. An impregnating agent according to claim 1, wherein said solvent is ethanol.

10. An impregnating agent for a cellulose article comprising: (a) an alkyltrialkoxysilane of the formula R $Si(OR')_3$, in which R represents an alkyl moiety of 1 to 18 carbon atoms and R' an alkyl moiety of 1 to 4 carbon atoms, and (b) a chelate or alcholoate of a metal of the third main group of the periodic system of the elements, wherein component (a) is present in the mixture in an amount between 5 and 99.5 wt.-% and component (b) is present in an amount between 0.5 and 95 wt.-%, the combined amounts of components (a) and (b) being present in an amount effective to produce an impregnating agent which has a water-proofing action on cellulose.

11. An impregnating agent for a cellulose article comprising:

(a) An alkyltrialkoxysilane of the formula R $Si(OR')_3$, in which R represents an alkyl moiety of 1 to 18 carbon atoms and R' an alkyl moiety of 1 to 4 carbon atoms, and (b) a metallic acid ester of the formula $$Me^{III}(OR)_3$$

wherein $Me^{III}$ represents a metal of the third main group of the periodic table and R represents an alkyl moiety of 1 to 8 carbon atoms or an oligomer thereof with up to 10 Me—O—Me units, wherein component (a) is present in the mixture in an amount between 5 and 99.5 wt.-% and component (b) is present in an amount between 0.5 and 95 wt.-%, the combined amounts of components (a) and (b) being present in an amount effective to produce an impregnating agent which has a water-proofing action on cellulose.

12. An impregnating agent for a cellulose article comprising:

(a) an alkyltrialkoxysilane of the formula R $Si(OR')_3$, in which R represents an alkyl moiety of 1 to 18 carbon atoms and R' an alkyl moiety of 1 to 4 carbon atoms, and (b) a chelate or alcoholate of a metal of the third man group of the periodic system of the elements, a metallic acid ester of the formula $$Me^{IV}O(OR)_2$$

wherein $ME^{IV}$ is, titanium, zirconium or hafnium, and

R is $C_{1-8}$ alkyl or an oligomer thereof with up to 10 Me—O—Me units, wherein component (a) is present in the mixture in an amount between 5 and 99.5 wt.-% and component (b) is present in an amount between 0.5 and 95 wt.-%, the combined amounts of components (a) and (b) being present in an amount effective to produce an impregnating agent which has a water-proofing action on cellulose.

13. An impregnating agent for a cellulose article comprising:

(a) an alkyltrialkoxysilane of the formula R $Si(OR')_3$, in which R represents an alkyl moiety of 1 to 18 carbon atoms and R' an alkyl moiety of 1 to 4 carbon atoms, and (b) a chelate of tin with acetylacetonate, wherein component (a) is present in the mixture in an amount between 5 and 99.5 wt.-% and component (b) is present in an amount between 0.5 and 95 wt.-%, the combined amounts of components (a) and (b) being present in an amount effective to produce an impregnating agent which has a water-proofing action on cellulose.

14. A method of rendering a cellulose article water repellant which comprises contacting said cellulose containing composition with the impregnating agent of claim 1.

15. A method of rendering a cellulose article water repellent which comprises contacting said cellulose containing composition with the impregnating agent of claim 2.

16. A method of rendering a cellulose article water repellant which comprises contacting said cellulose containing composition with the impregnating agent of claim 10.

17. A method of rendering a cellulose article water repellant which comprises contacting said cellulose containing composition with the impregnating agent of claim 11.

18. A method of rendering a cellulose article water repellant which comprises contacting said cellulose containing composition with the impregnating agent of claim 12.

19. A method of rendering a cellulose article water repellant which comprises contacting said cellulose containing composition with the impregnating agent of claim 13.

20. A method of rendering a cellulose article water-repellent which comprises contacting said cellulose-containing composition with an impregnating agent comprising:

(a) an alkyltrialkoxysilane of the formula R $Si(OR')_3$, in which R represents an alkyl moiety of 1 to 18 carbon atoms and R' an alkyl moiety of 1 to 4 carbon atoms; and (b) a chelate or alcoholate of tin or metal of the third main group or fourth or fifth secondary group of the periodic system of the elements, wherein component (a) is present in the mixture in an amount between 5 and 99.5 wt.-% and component (b) is present in an amount between 0.5 and 95 wt.-% the combined amounts of components (a) and (b) being present in an amount effective to produce an impregnating agent which has a water-proofing action on cellulose.

21. A method of rendering paper water repellent which comprises contacting said paper with an impregnating agent comprising: (a) an alkyltrialkoxysilane of the formula R $Si(OR')_3$, in which R represents an alkyl moiety of 1 to 18 carbon atoms and R' an alkyl moiety of 1 to 4 carbon items; and (b) a silicic acid ester of the formula $Si(OR')_4'$ wherein R is an alkyl moiety of 1 to 8 carbon atoms or an oligomer thereof with up to 10 Si—O—Si units, said impregnating agent containing 60 to 98% by-weight of said alkyltrialkoxysilane and 2 to 40% by-weight of said silicic acid ester, said alkyltrialkoxysilane and said silicic acid ester being present in an amount effective to produce an impregnating agent which has a water proofing action on paper.

* * * * *